United States Patent
Horii et al.

(10) Patent No.: US 10,877,962 B2
(45) Date of Patent: Dec. 29, 2020

(54) DEFERRED UPDATE OF DATABASE HASHCODE IN BLOCKCHAIN

(71) Applicant: International Business Machines Corporation, Armonk, NY (US)

(72) Inventors: Hiroshi Horii, Tokyo (JP); Ryo Kawahara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 15/674,629

(22) Filed: Aug. 11, 2017

(65) Prior Publication Data
US 2019/0050402 A1  Feb. 14, 2019

(51) Int. Cl.
  G06F 16/00 (2019.01)
  G06F 16/23 (2019.01)
  H04L 9/06 (2006.01)

(52) U.S. Cl.
  CPC .......... *G06F 16/2386* (2019.01); *G06F 16/23* (2019.01); *G06F 16/235* (2019.01); *H04L 9/0643* (2013.01)

(58) Field of Classification Search
  CPC .... G06F 16/2386; G06F 16/23; G06F 16/235; H04L 9/0643
  See application file for complete search history.

(56) References Cited

U.S. PATENT DOCUMENTS

| | | | |
|---|---|---|---|
| 9,418,094 B2 | 8/2016 | Wong | |
| 2010/0114832 A1* | 5/2010 | Lillibridge | G06F 16/128 |
| | | | 707/649 |
| 2015/0161182 A1 | 6/2015 | Baeuerle et al. | |
| 2016/0086441 A1 | 3/2016 | Cohen et al. | |
| 2016/0147797 A1 | 5/2016 | Dolph et al. | |
| 2017/0148016 A1 | 5/2017 | Davis | |
| 2017/0228371 A1* | 8/2017 | Seger, II | G06F 16/215 |
| 2017/0364699 A1* | 12/2017 | Goldfarb | H04L 9/3239 |
| 2018/0089041 A1* | 3/2018 | Smith | G06F 11/1474 |
| 2018/0101560 A1* | 4/2018 | Christidis | G06F 16/215 |
| 2018/0260324 A1* | 9/2018 | Marathe | G06F 12/0804 |

OTHER PUBLICATIONS

Google Search (Year: 2016).*

* cited by examiner

*Primary Examiner* — Mark D Featherstone
*Assistant Examiner* — Kweku William Halm
(74) *Attorney, Agent, or Firm* — Daniel C. Housley

(57) ABSTRACT

A computer-implemented method for updating a database in a blockchain system to add a block to a blockchain may include: adding an update query to the database as a data item upon receiving the update query to update the database; calculating a hash value based on data items stored in the database, the stored data items including the added data item of the update query; and adding a new block to the blockchain using the hash value.

20 Claims, 14 Drawing Sheets

DEFERRED UPDATE OF DATABASE HASHCODE IN BLOCKCHAIN

BACKGROUND

The present invention relates to blockchains, more specifically, to the update of a database in a blockchain.

Recently, various update techniques have been disclosed regarding blockchains. In blockchain technology, multiple blocks are coupled to each other like a chain so that one blockchain is formed on a network. One block may include multiple transactions and a hash value of transactions in the immediately preceding block. Note that a transaction refers to an indivisible series of processes for updating a database. Further, the transactions included in the block are considered correct/accurate transactions.

Here, a block system for updating a database may include multiple nodes. Each node may process transactions serially. If many data items are modified in a specific transaction (e.g., to divide the inventory for a specific company), a process of the subsequent transaction may not start until all of the modifications (updates) of the data items in the specific transaction have been applied to the database. In other words, recalculation of the state of the database is expensive when a transaction modifies a large number of data items.

SUMMARY

According to an embodiment of the present invention, provided is a computer-implemented method for updating a database in a blockchain system to add a block to a blockchain. The method includes adding an update query to the database as a data item upon receiving the update query to update the database. The method includes calculating a hash value based on data items stored in the database. The stored data items include the added data item of the update query. The method includes adding a new block to the blockchain using the hash value. This method may shorten the latency associated with updating the database.

Here, the above method may further include generating a second database by copying the database, updating the second database according to the added data item of the update query, calculating a second hash value based on data items stored in the updated second database, and adding a new block to the blockchain using the second hash value. This method may shorten the latency associated with updating the database using the second database.

According to embodiments, provided is a computer-implemented method for updating a database in a blockchain. The blockchain may be shared among plural nodes included in a blockchain system. The nodes may be connected to each other via a network. The nodes may generate a block to be added to the blockchain according to an update of the database. Upon receiving an update query to update the database, each node determines whether to apply the update query to the database using a regular update, or to apply the update query to the database using a deferred update. If each node determines to apply the update query to the database using the regular update, the database may be updated according to the update query; a regular hash value may be calculated based on the updated database, and a new block may be added to the blockchain using the regular hash value. If each node determines to apply the update query to the database using the deferred update, a second database may be generated by copying the database. Consequently, the update query may be added to the database as a data item of the database, a deferred hash value may be calculated based on the database to which the update query is added as the data item, a new block may be added to the blockchain using the deferred hash value, and the second database may be updated according to the data item of the update query added to the database. The database may be replaced with the second database when a predetermined number of blocks are added to the blockchain. A replaced hash value may be calculated based on the replaced database, and a new block may be added to the blockchain using the replaced hash value. This method may shorten the latency associated with updating the database.

In the above method, if each node receives a second update query and determines to apply the second update query to the database using the regular update, then prior to updating the second database according to the update query, the database may be updated by applying the update query and the second update query to the database. An updated hash value may be calculated based on the database updated with the update query and the second update query, and the second database may be updated by applying the update query and the second update query to the second database. This method may shorten the latency associated with updating the database with respect to the second update query.

In embodiments, provided is a computer program product for updating a database in a block chain system to add a block to a blockchain. The computer program product includes a computer readable storage medium having program instructions embodied therewith. The program instructions are executable by a computer and may cause the computer to perform a method including adding an update query to the database as a data item upon receiving the update query to update the database. The method includes calculating a hash value based on data items stored in the database. The stored data items include the added data item of the update query. The method includes adding a new block to the blockchain using the hash value. This method may shorten the latency associated with updating the database.

Here, the above method may further include generating a second database by copying the database, updating the second database according to the added data item of the update query, calculating a second hash value based on data items stored in the updated second database, and adding a new block to the blockchain using the second hash value. This method may shorten the latency associated with updating the database using the second database.

According to embodiments, provided is a device for a blockchain system to add a block to a blockchain. The device includes a database to be updated to add the block to the blockchain. The device includes an update query adding part for adding an update query to the database as a data item upon receiving the update query to update the database. The device includes a calculating part for calculating a hash value based on data items stored in the database. The stored data items include the added data item of the update query. The device includes a block adding part for adding a new block to the blockchain using the hash value. This device may shorten the latency associated with updating the database.

Here, the above device may further include a generating part for generating a second database by copying the database, and an updating part for updating the second database according to the added data item of the update query. In this device, the calculating part may calculate a second hash value based on data items stored in the updated second database, and the block adding part may add a new block to the blockchain using the second hash value. This device may shorten the latency associated with updating the database using the second database.

DETAILED DESCRIPTION

Hereinafter, embodiments of the present disclosure will be described in detail with reference to the attached drawings.

It is noted that the present disclosure is not meant to be limited to these embodiments below, and the present disclosure may be implemented with various modifications within the scope of the present disclosure. Additionally, the drawings used herein are for purposes of illustration, and may not show actual dimensions.

Figure 1:
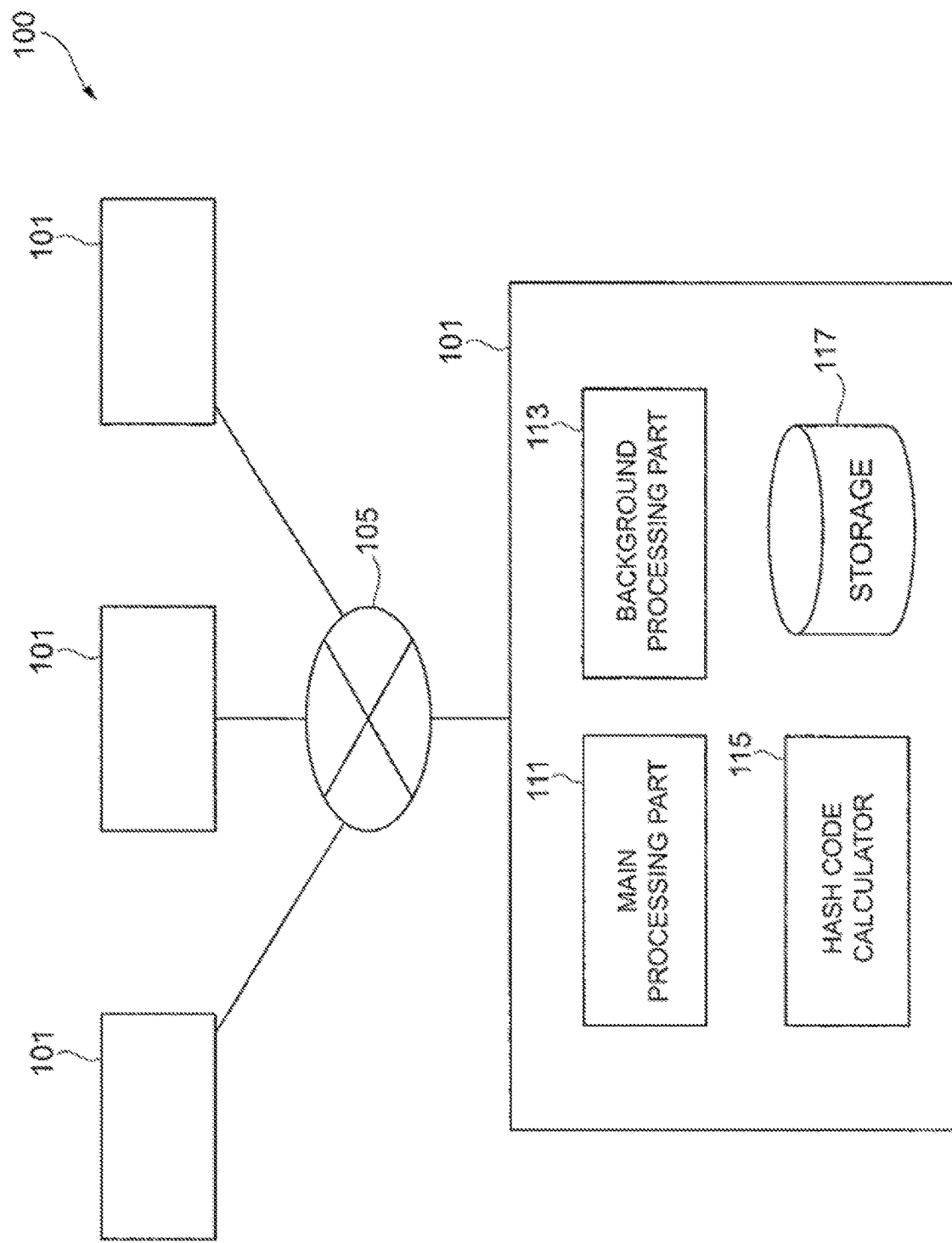
FIG. 1 depicts a block diagram of a blockchain system, according to embodiments.

FIG. 1 depicts a block diagram of a blockchain system 100, according to embodiments. The blockchain system 100 may include multiple nodes (e.g., devices) 101 connected to each other via a network 105. Each node 101 may include a main processing part 111, a background processing part 113, a hash code calculator 115, and a storage 117.

The main processing part 111 may receive a query (e.g., an update query) to update a database and add a block to a blockchain, as described herein.

Figure 2A:
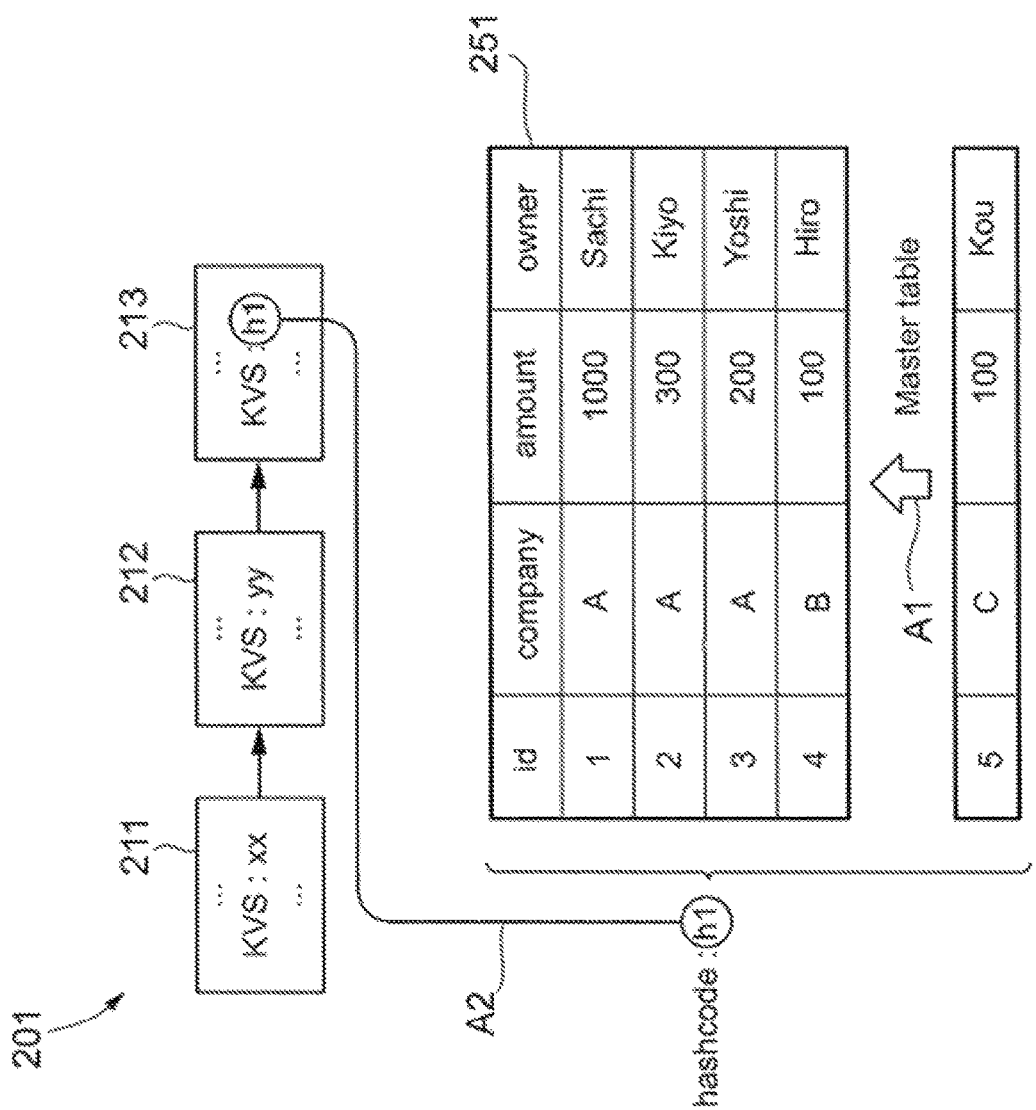
FIGS. 2A to 2F depict a process for updating a blockchain, according to embodiments.

The background processing part 113 performs a process on a background table 261 (e.g., the process described in reference to FIG. 2A) according to the filter 253 (refer to FIG. 2A). The background processing part 113 is an example of the claimed updating part.

The hash code calculator 115 calculates and sets a hash code (e.g., a hash value) of the transaction(s) to be included in the block in the blockchain. The hash code calculator 115 is an example of the claimed calculating part.

The storage 117 may store data associated with the blockchain.

In the blockchain system 100 of the exemplary embodiment, each node 101 may include its own database, e.g. a master table 251 (described later), in its own storage 117 and may execute transactions in the same order as other nodes. This enables the nodes 101 to keep the respective databases in the same state. Further, each node 101 may calculate, via hash calculator 115, the hash code based on the state of its database for execution of each transaction. A byzantine failure of the node 101 may be detected by finding different hash codes in the nodes 101.

In the exemplary embodiment, to reduce overheads for calculating the hash code, the storage 117 stores data items in a tree structure, which includes tree nodes (e.g., a root node and multiple leaf nodes, and edges connecting them). The hash code calculator 115 may calculate the hash code in the tree structure. More specifically, when a data item is modified, only nodes from the modified item, e.g. the leaf node, to the root node are calculated/recalculated.

In the deferred update, when a data item is read from the database, updates which have not been applied to the data item are applied. This means that the update query is evaluated lazily. However, in the blockchain technology, updated data items are read to calculate a hash code of the database when the transaction has been finished. That is, every update query is required to be applied to the data items immediately.

In the exemplary embodiment, each node 101 may perform both the deferred update and the background update (e.g., a parallelized update). In other words, each node 101 may apply a modification to the data items and recalculate the hash code in the background. All nodes 101 make new (e.g., modified) data items and a new hash code which are available from a specific block in the blockchain (described later).

FIGS. 2A to 2F is an example of an updating process of the blockchain 201 according to the exemplary embodiment. Referring to FIGS. 1, and 2A-2F, an example of an updating process of the blockchain 201 will be described.

In the exemplary embodiment, the main processing part 111 performs a process to update the master table 251 based on the received query. For example, the query is to modify a data item in the master table 251. The master table 251 may represent, or be included in, a database stored in the storage 117. In other words, the master table 251 may be data to be processed by the main processing part 111. The main processing part 111 analyzes the received query. That is to say, the main processing part 111 evaluates a property of the received query to add block 211 to the blockchain 201. The master table 251 is an example of the claimed database.

Based on the result of the evaluation (e.g., the analysis), the main processing part 111 determines whether the subject query calls a heavy-update. The heavy-update refers to an update (e.g., a calculation/recalculation) which requires a relatively heavy calculation. For example, the heavy-update requires updating multiple data items in the master table 251. The query not to call the heavy-update is an example of claimed another update query.

The main processing part 111 may generate a filter 253 based on the evaluation of the analysis. More specifically, the main processing part 111 may generate the filter 253 if the subject query calls the heavy-update. The filter 253 may define a calculation on data items (e.g., values included in the master table 251). Further, the main processing part 111 and the background processing part 113 may execute the calculation according to the filter 253. Note that if the main processing part 111 receives multiple queries calling the heavy-update, the main processing part 111 may generate multiple filters 253.

The main processing part 111 may also generate the background table 261 based on the evaluation of the analysis. The background table 261 may be a copy of the master table 251. In other words, the background table 261 may be data to be processed by the background processing part 113. The background table 261 is an example of a second database.

The main processing part 111 also determines, based on the result of the analysis, a number N. The number N represents a timing variable for adding a new block in the blockchain 201. Note that the number N is deterministically specified based on one or more properties of the query.

The main processing part 111 is an example of the claimed query adding part, the block adding part, the generating part, the replacing part, the determining part, and/or the updating part.

Here, as mentioned above, each node 101 may apply the modification to the data items and calculate/recalculate the hash code in the background. More specifically, when a transaction (e.g., a query) calls the heavy-update, the main processing part 111 adds the filter 253 to the master table 251 as a data item, instead of updating the data items immediately. The hash code calculator 115 calculates/recalculates a hash code based on the master table 251 with the filter 253, and then creates a copy of the master table 251 to create the background table 261. A logical copy using copy-on-write techniques may be applied. Note that the background table 261 may not include the filter 253.

In the background processing of the transactions, the node 101 may apply the heavy-update to the background table 261 using different threads.

At a specific block in the blockchain 201, the master table 251 may be replaced with the background table 261. Note that every node 101 replaces the master table 251 at the same point of the blockchain 201. The specific block may be an Nth block which is N blocks away from the block of the heavy-update. This process is an example of the claimed deferred update.

Figure 9:
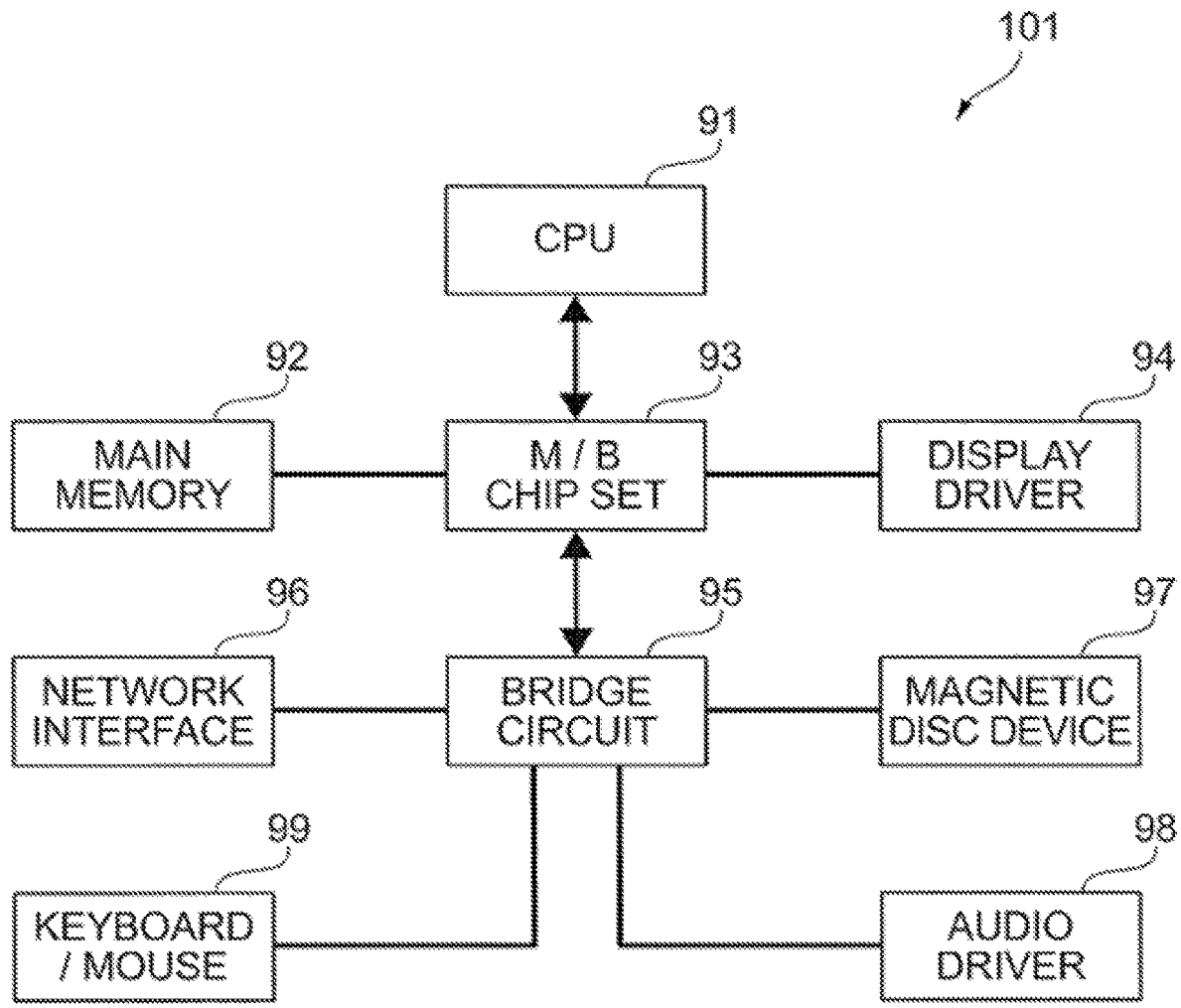
FIG. 9 is an example of a hardware configuration of a node, according to embodiments.

Note that every node 101 includes a central processing unit (CPU) 91 (described in the description of FIG. 9). The exemplary embodiment assumes that a CPU utilization of each node 101 is low and that heavy-updates rarely happen.

Hereinafter, a detailed explanation is given to the updating process of the blockchain 201. The example assumes that the master table 251 may be used to manage a distribution warehouse or production facility servicing several different companies with various franchise owners, taking into account and the amount of local inventory each owner has. However, the master table 251 may represent any manner of data items and this example is not meant to limit the scope of the disclosure to managing inventories, or to limit the scope of the disclosure in any other way. This example further assumes that the master table 251 is to be updated sequentially according to the transaction 1 (Tx1), the transaction 2 (Tx2), and the transaction 3 (Tx3) in this order. The transaction 2 is assumed to be a heavy-update, while the transactions 1, 3 are assumed not to be heavy-updates.

As shown in FIG. 2A, the blockchain 201 may include block 211 and block 212. In the blocks 211 and 212, the data may be stored using a so-called key-value store (KVS). In embodiments, the master table 251 may include data columns "id," "company," "amount," and "owner." Further, the master table 251 includes data items (e.g., rows, entry) of id 1, id 2, id 3, and id 4. For example, the data item of "id=1" represents that "company=A," "amount=1000," and that the "owner=Sachi."

The master table 251 may first be updated according to the transaction 1 (Tx1): INSERT VALUES (5, C, 100, Kou). The main processing part 111 inserts the data item of id 5 to the master table 251 (refer to arrow A1). The hash code calculator 115 then calculates the hash code of the updated master table 251 to obtain a hash code h1. The main processing part 111 may add a block 213, including the obtained hash code h1, to the blockchain 201 (refer to A2). This process is an example of the claimed regular update. The hash code h1 is an example of the claimed non-added hash code, or the regular hash code.

Figure 2B:
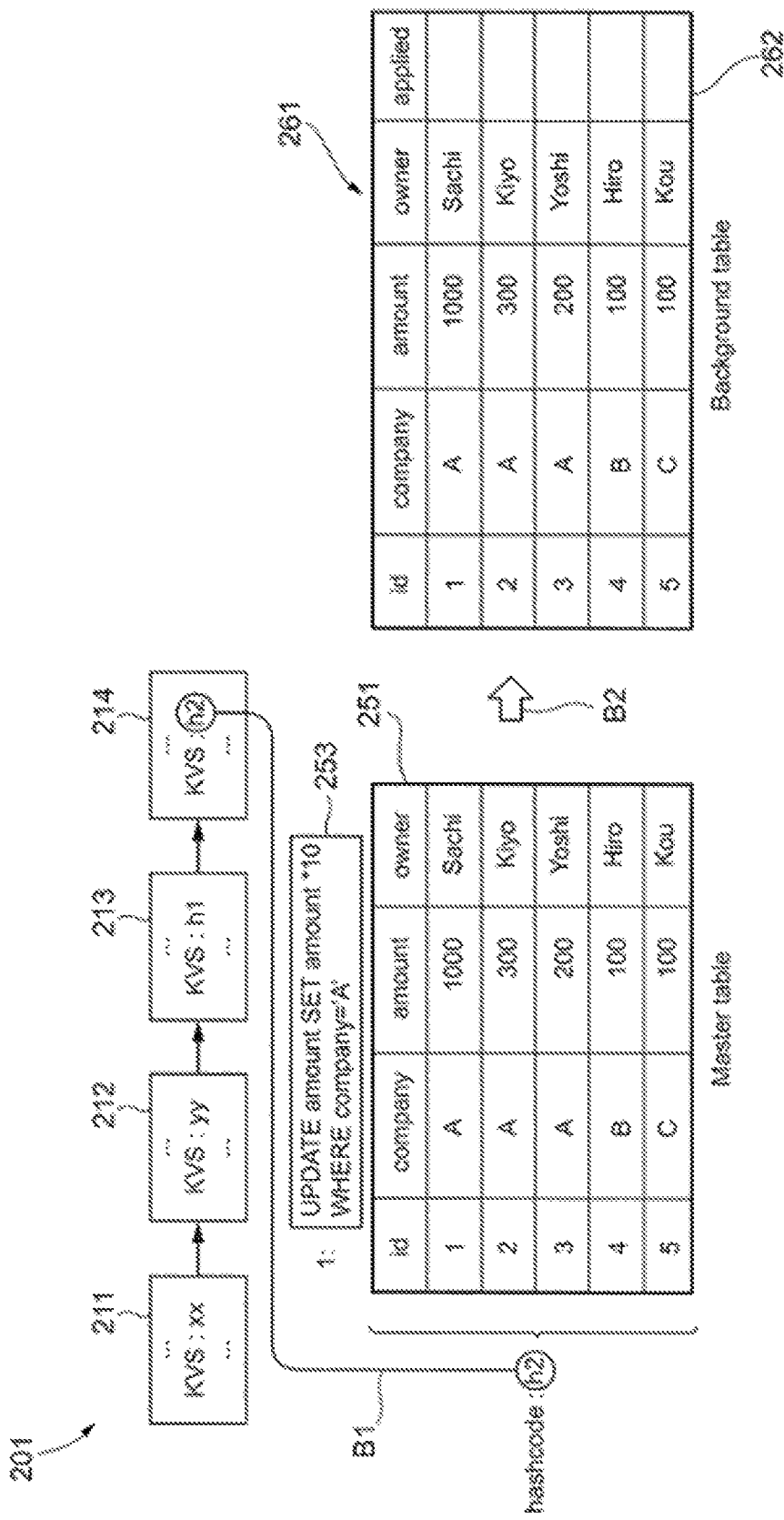

As shown in FIG. 2B, the master table 251 may be updated according to transaction 2 (Tx2): UPDATE amount SET amount*10 WHERE company='A.' The main processing part 111 may not perform a calculation according to the transaction 2 at this point, since transaction 2 is a heavy-update. In other words, the main processing part 111 may not modify the data items of the master table 251 immediately. Instead of modifying the data items of the master table 251, the main processing part 111 may generate filter 253, based on the attributes of transaction 2 (e.g., the received query). The hash code calculator 115 may then calculate the hash code of the master table 251 with the filter 253 to obtain a hash code h2. The main processing part 111 may add a block 214, including the obtained hash code h2, to the blockchain 201 (refer to B1). The hash code h2 is an example of the claimed deferred hash code.

Here, in the present exemplary embodiment, the heavy-update, (e.g., the received query Tx2) is handled as a data item (e.g., an entry) attached to the master table 251 so that the hash code calculator 115 may calculate the hash code of the master table 251 with the query.

The background processing part 113 may then generate background table 261, according to the master table 251 (refer to arrow B2). In this exemplary embodiment, the background table 261 is a snapshot of the master table 251. Further, the background table 261 includes an "applied" column 262 in addition to the data columns of the master table 251. The "applied" column 262 represents whether the filter 253 has been applied to the subject data item or not. If the filter 253 has been applied to the subject data item, "1" is placed in the corresponding cell in the "applied" column 262.

Figure 2C:
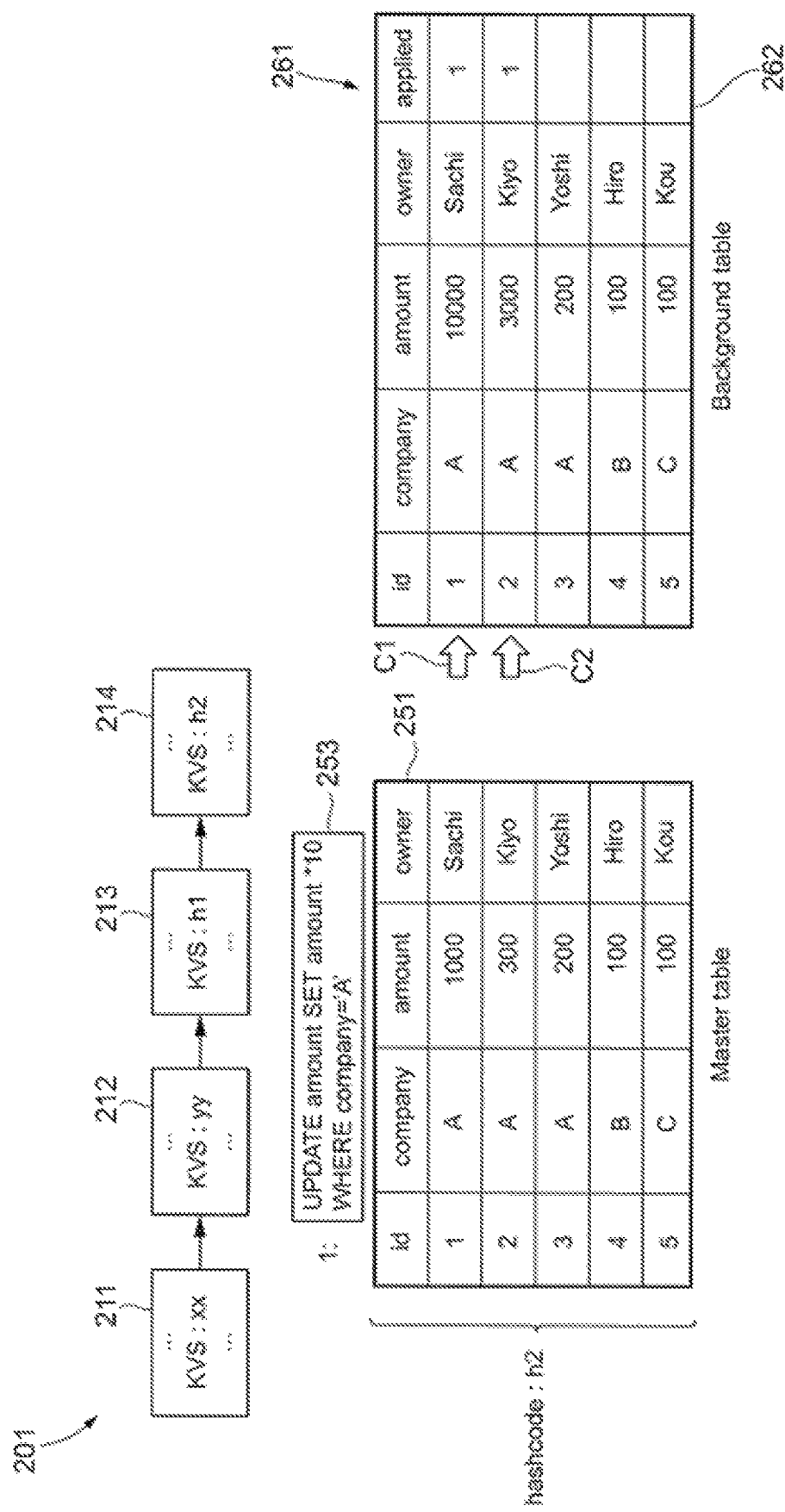

As shown in FIG. 2C, the background processing part 113 applies the heavy-update to each row of the background table 261 (refer to arrows C1, C2). In other words, the filter 253 is applied to the background table 261 step-by-step. For example, the data item of id 1 in the background table 261 is updated with the filter 253. Because the data item of "id=1" represents the data of "company=A," the instructions of query Tx2 will be applied to the row of "id=1." In the row (e.g., data item) of "id=1," "amount" is modified from "1000" to "10000," which is gained by multiplying the "1000" by "10," as dictated in query Tx2. Further, "1" is placed in the "applied" column 262 for the data item "id=1," thereby indicating that query Tx2 has been applied to the data item.

Figure 2D:
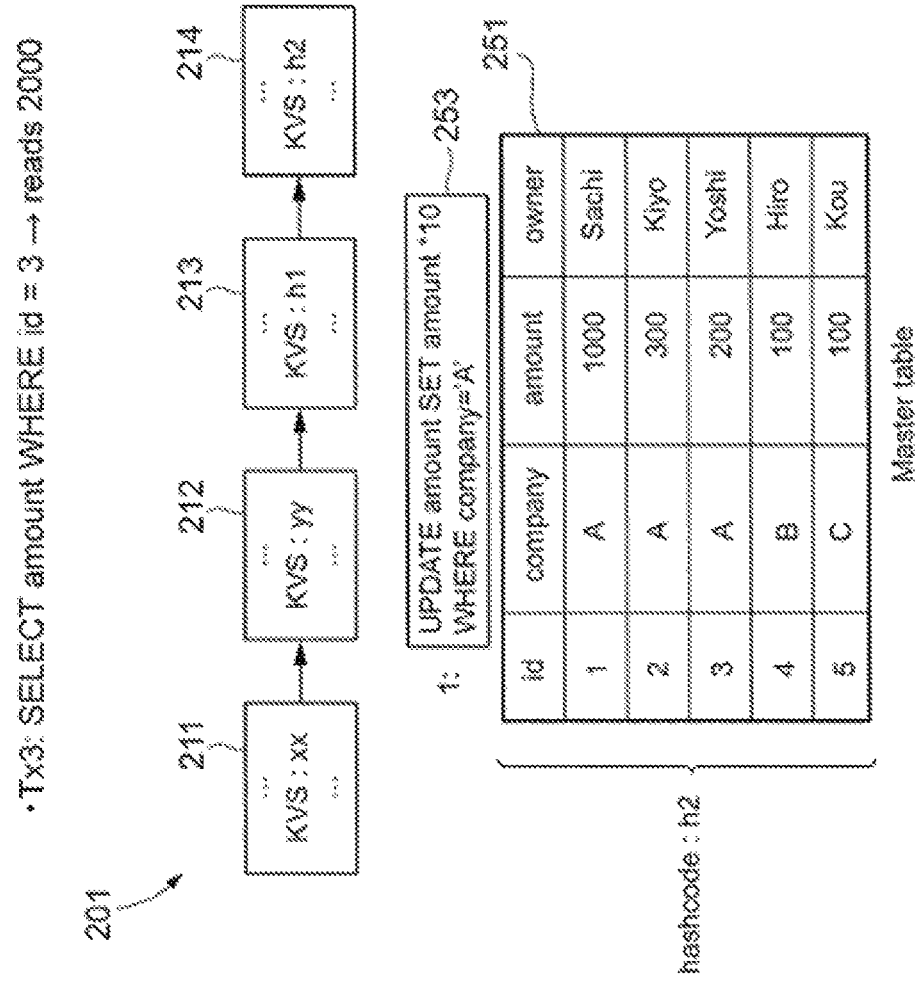

As shown in FIG. 2D, while the heavy-update is being applied to the background table 261, the transaction 3, "Tx3: SELECT amount WHERE id=3 and UPDATE owner SET 'Take' where id=3," may start. Note that the filter 253 has not been applied to the data item of "id=3" of the background table 261 at this point. The background processing part 113 obtains the filter 253 and a value of the data item of "id=3" in the background table 261, (e.g., "amount=200") to apply the filter 253 to the value of the data item of "id=3". In this example, the background processing part 113 applies filter 253 to "id=3" to obtain "amount=2000" as a result.

Figure 2E:
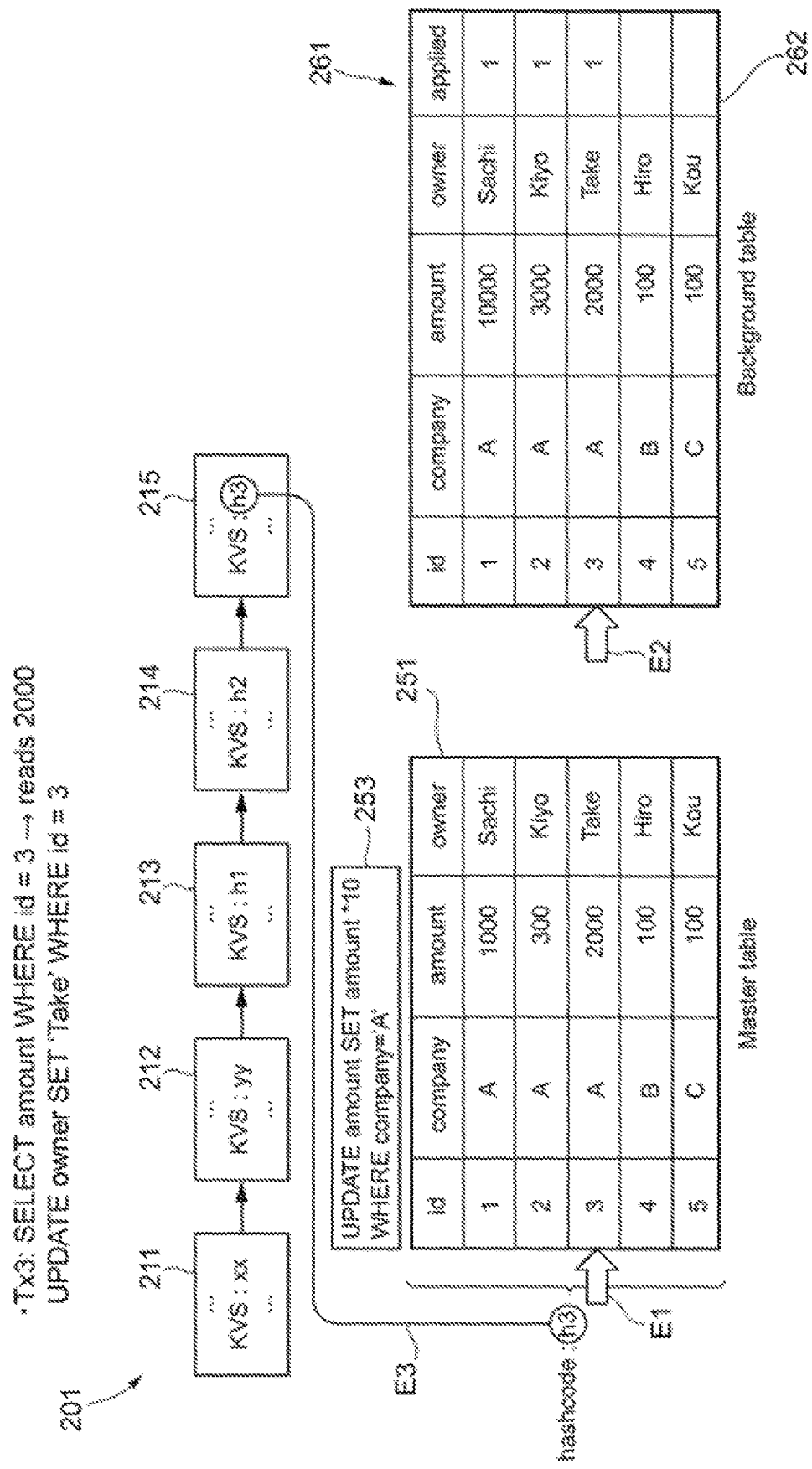

As shown in FIG. 2E, the main processing part 111 may update the master table 251 according to the result gained by the background processing part 113 and change the owner from "Yoshi" to "Take," according to the transaction 3 (refer to arrow E1). Similarly, the background processing part 113 may update the background table 261 according to the result and change the owner (refer to arrow E2). In other words, the update according to the filter 253 is applied to both the master table 251 and the background table 261. The hash code calculator 115 may then calculate a hash code of the updated master table 251 to obtain a hash code h3. The main processing part 111 may add block 215, including the obtained hash code h3, to the blockchain 201 (refer to E3). The hash code h3 is an example of the claimed updated hash code.

Figure 2F:
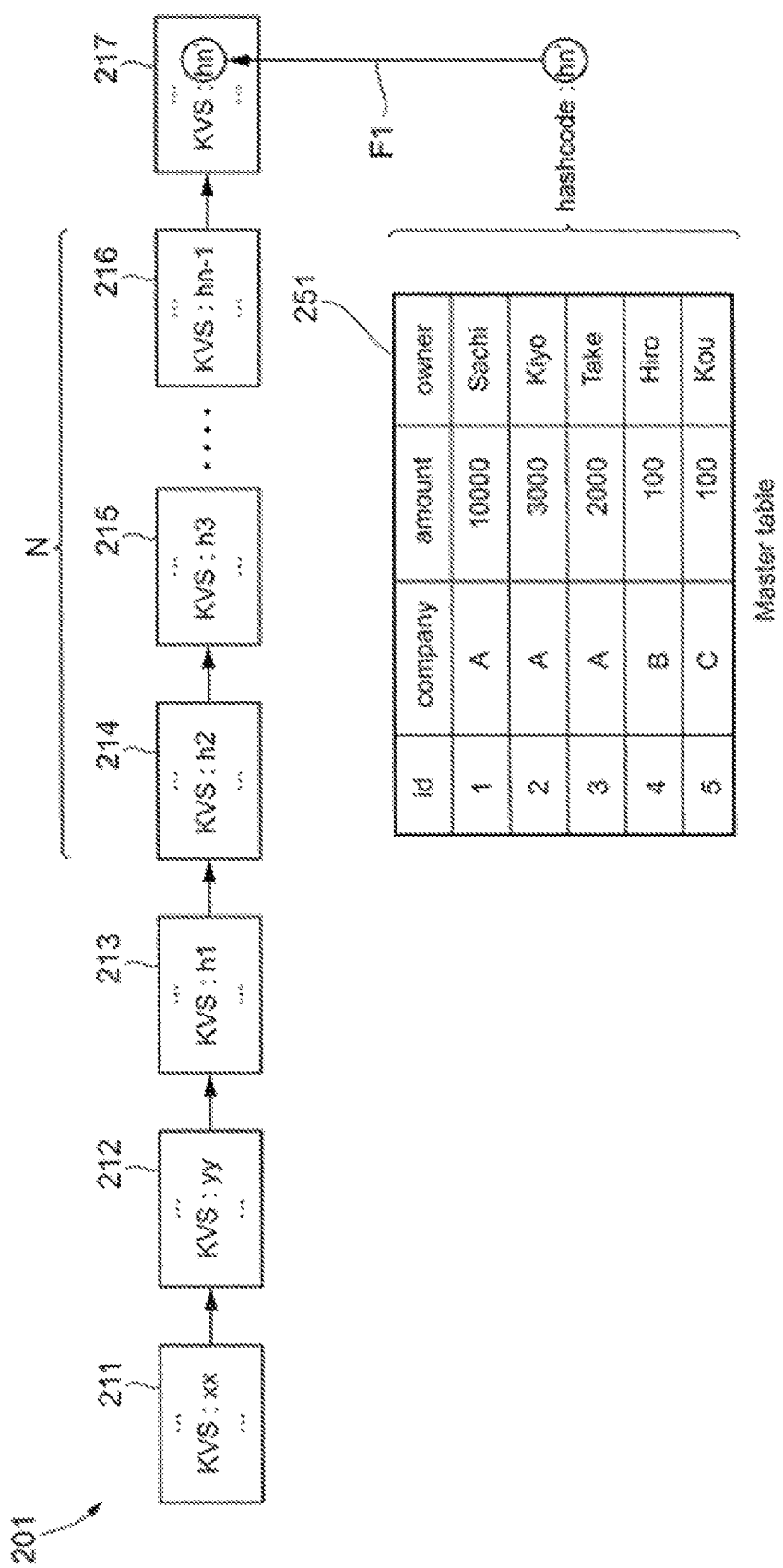

As shown in FIG. 2F, upon making certain updates to the master table 251, the main processing part 111 may add block 216 to the blockchain 201. When N blocks are added to the blockchain 201 from block 214, including the hash code h2, the main processing part 111 may replace the master table 251 with the background table 261. The hash code calculator 115 may then calculate a hash code of the updated master table 251 to obtain hash code hn'. The main processing part 111 may add block 217, including the obtained hash code hn', to the blockchain 201 (refer to arrow F1). The hash code hn' is an example of the claimed second hash code, or the replaced hash code.

Here, as mentioned above referring to FIG. 1, the blockchain system 100 includes multiple nodes 101. All nodes 101, or at least some of the nodes 101, add the block 217 at a common timing (e.g., simultaneously, or in parallel). In other words, the nodes 101 update the blockchain 201 based on the same trigger. The common timing is an example of the claimed predetermined timing.

Figure 3:
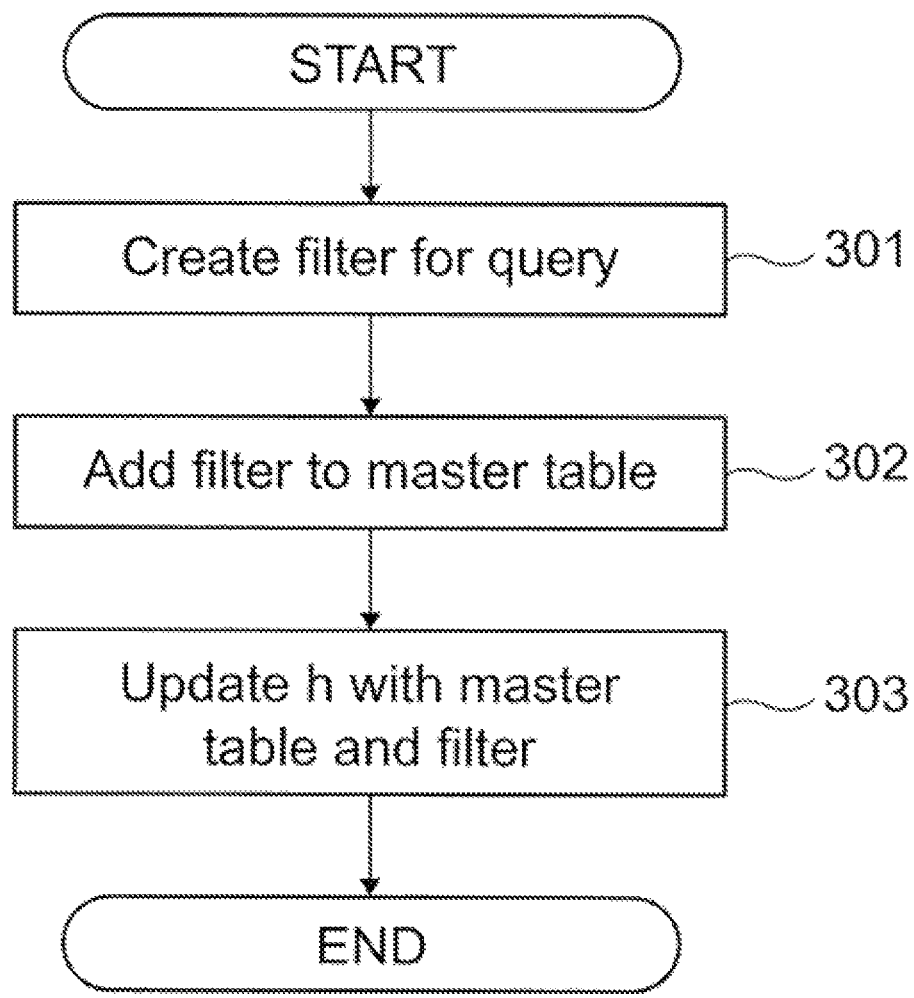
FIG. 3 depicts a flowchart of a process for updating a master table, according to embodiments.

FIG. 3 is a flowchart of a process for updating the master table 251. This process may start if the main processing part 111 determines that the received query calls for a heavy-update.

The main processing part 111 first creates a filter (e.g., the filter 253 of FIGS. 2B-2E) for the heavy-update query at 301. The main processing part 111 then adds the filter (e.g., the filter 253 of FIGS. 2B-2E) to the master table (e.g., the master table of FIGS. 2A-2F) at 302. The hash code calculator 115 then calculates (e.g., recalculates, or updates) the hash code h with the master table (e.g., the master table of FIGS. 2A-2F) and the filter (e.g., the filter 253 of FIGS. 2B-2E) at 303.

Figure 4:
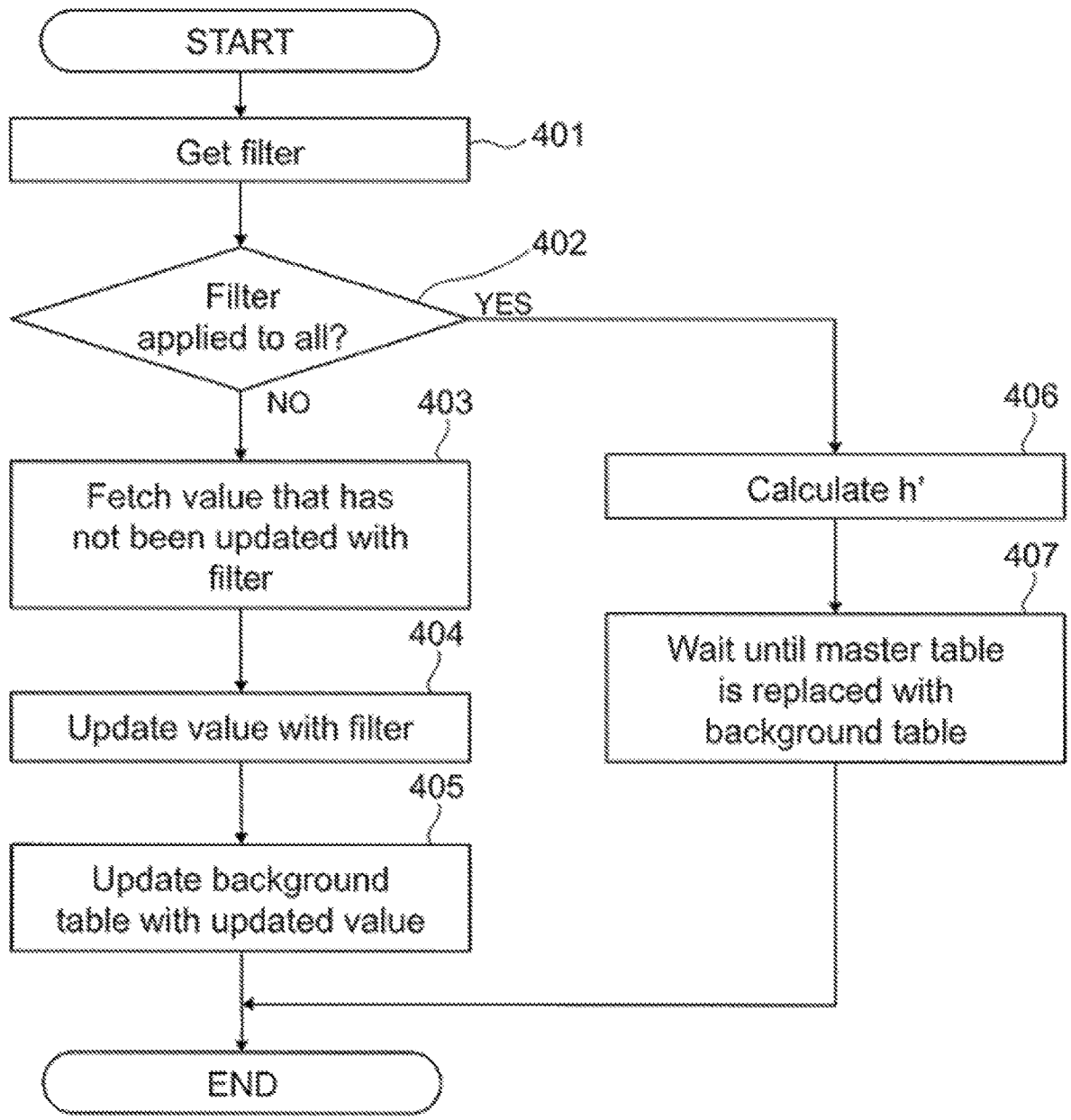
FIG. 4 depicts a flowchart of a process for updating a background table, according to embodiments.

FIG. 4 is a flowchart of a process for updating a background table (e.g., the background table of FIGS. 2B-2E). Note that this process starts if the main processing part 111 generates a filter (e.g., the filter 253 of FIGS. 2B-2E) and the background processing part 113 generates the background table (e.g., the background table of FIGS. 2B-2E).

The background processing part 113 first obtains the filter at 401. The background processing part 113 then determines whether the filter has been applied to all data items in the background table at 402. If the filter has not been applied to all data items, the background processing part 113 fetches a value of the data item that has not been updated according to the filter at 403. The background processing part 113 then updates the fetched value, according to the filter's attributes, at 404. The background processing part 113 then updates the background table 261 with the updated value at 405. If, at 402, the filter has been applied to all data items, the hash code calculator 115 calculates a hash code h' of the background table at 406. The background processing part 113 then waits until the master table is replaced with the background table at 407.

Figure 5:
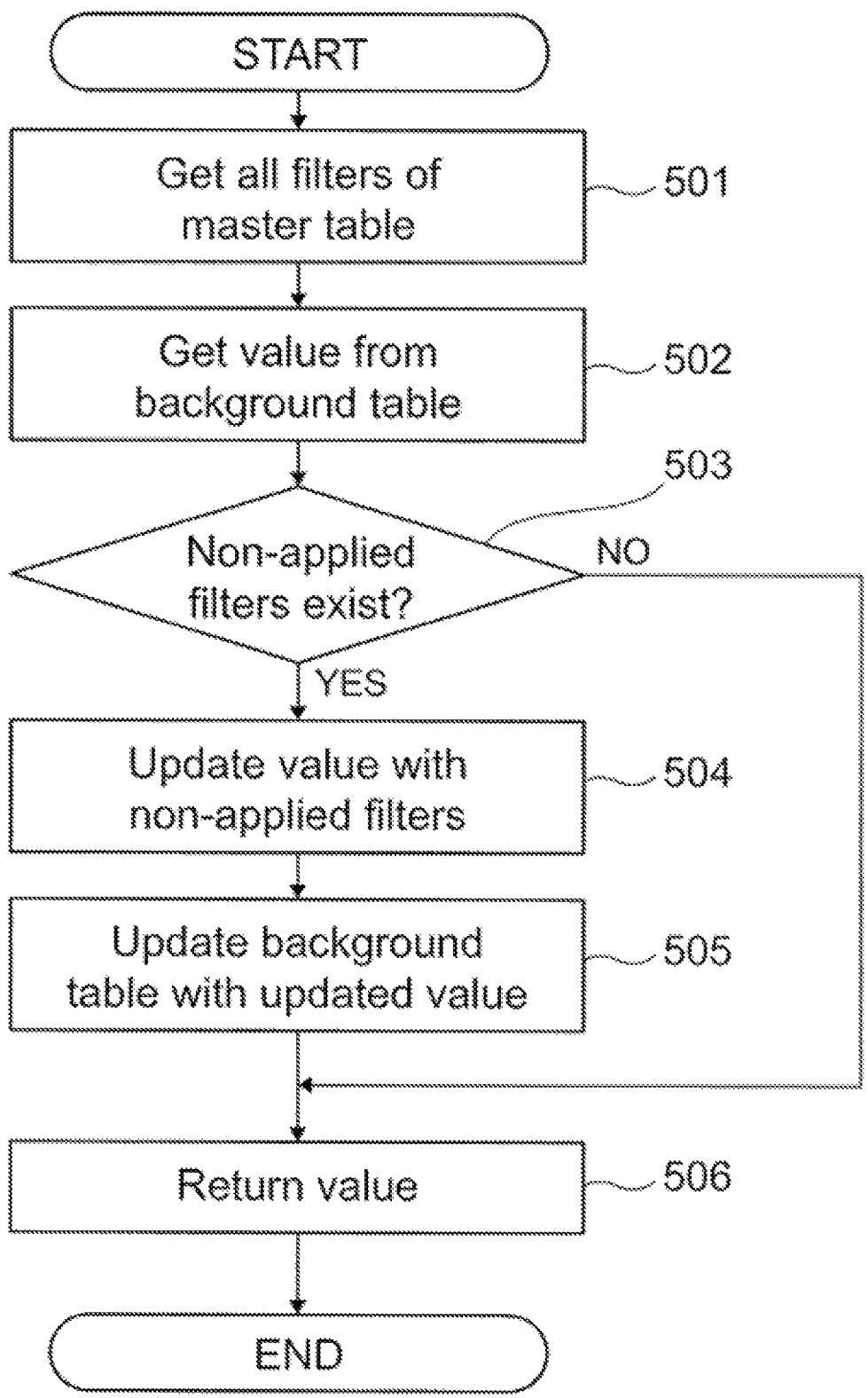
FIG. 5 depicts a flowchart of a process for adding a value of a data item into a background table, according to embodiments.

FIG. 5 is a flowchart of a process for obtaining a value of the data item in the background table. Note that this process may start if the main processing part 111 receives a query to get a value of the background table while the filter is being applied to the background table. In other words, this process may start if multiple filters are concurrently attached to the master table.

The background processing part 113 first gets all of the filters attached to the master table at 501. The background processing part 113 then gets the value of the data item, according to the filters, from the background table at 502. The background processing part 113 may determine whether a non-applied filter exists at 503. A non-applied filter refers to a filter which has not been applied to the background table. If, at 503, it is determined that a non-applied filter exists, the background processing part 113 updates the value of the data item in the background table, according to the non-applied filter, at 504. The background processing part 113 updates the background table with the updated value at 505. The background processing part 113 returns the value at 506.

Figure 6:
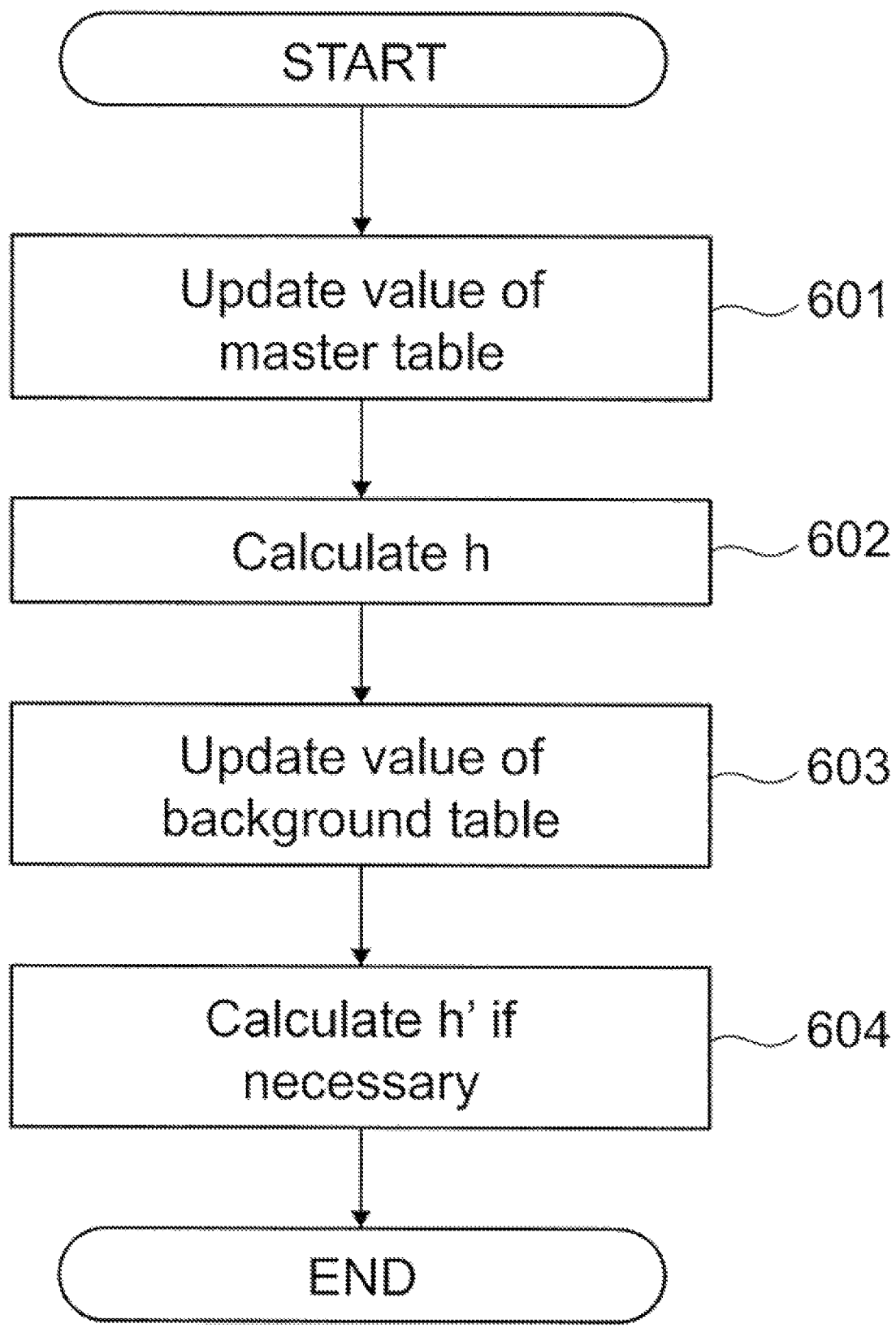
FIG. 6 depicts a flowchart of a process for updating a value of a data item in a master table and background table, according to embodiments.

FIG. 6 is a flowchart of a process for updating a value of the data item in a master table and its associated background table. This process may start if the main processing part 111 receives a query to update a value of the master table while a filter is being applied to the background table.

The main processing part 111 first updates the value of the master table at 601. The hash code calculator 115 then calculates the hash code h of the master table at 602. The background processing part 113 then updates the value of the background table at 603. The hash code calculator 115 then calculates the hash code h' of the background table, if necessary, at 604.

Figure 7:
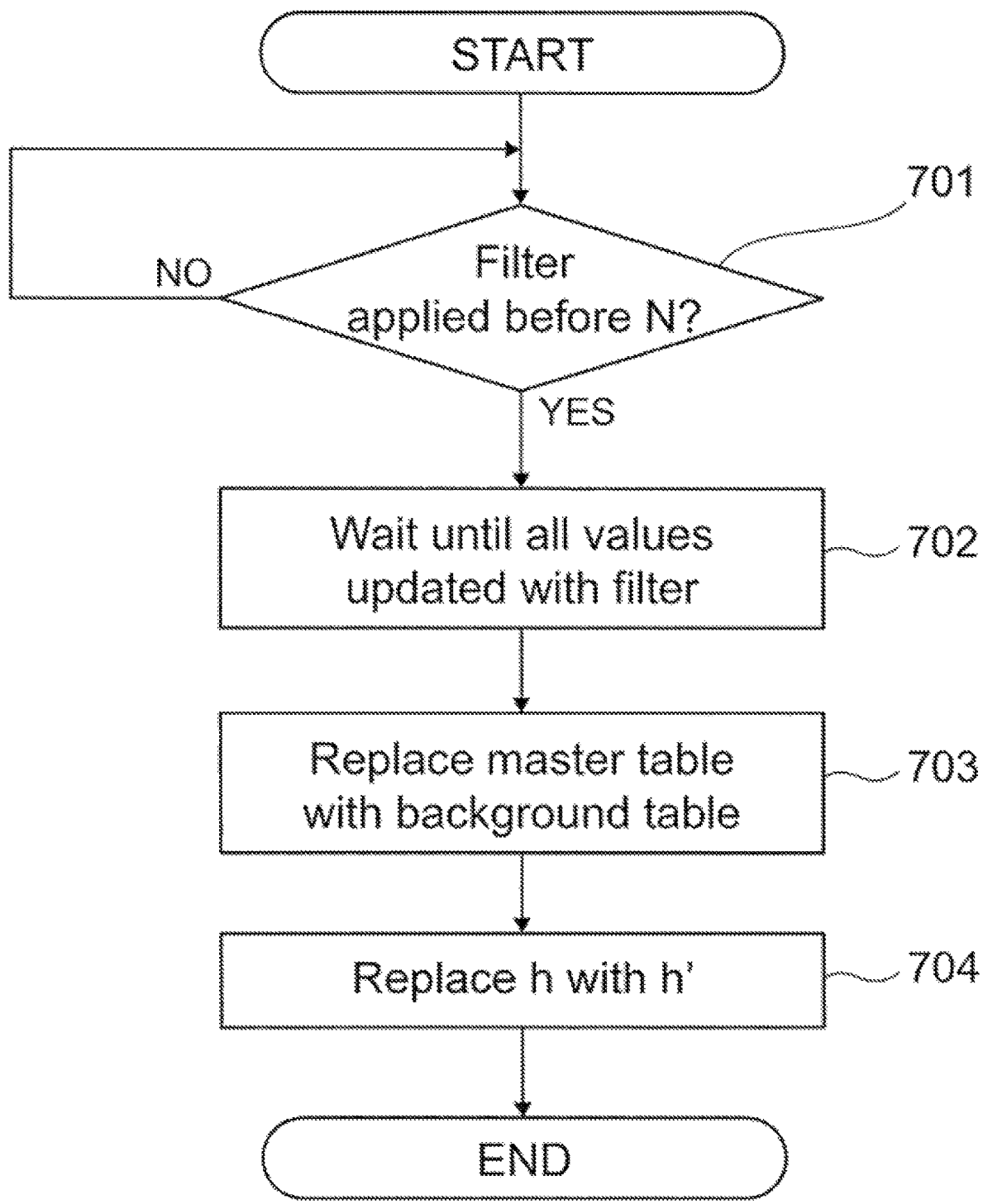
FIG. 7 depicts a flowchart of a process for applying a filter and replacing a master table with a background table, according to embodiments.

FIG. 7 is a flowchart of a process before adding a block (e.g., block 217 of FIG. 2F). Note that this process starts if the Nth block is added to the blockchain (see the description of FIG. 2F).

The main processing part 111 first determines whether a filter has been applied to a background table before the Nth block is added to the blockchain at 701. If, at 701, it is determined that the filter has been applied, the main processing part 111 waits until all values of the data items in the background table have been updated at 702. The main processing part 111 then replaces the master table with the background table at 703. The hash code calculator 115 then replaces the hash code h with the hash code h' at 704.

Figure 8:
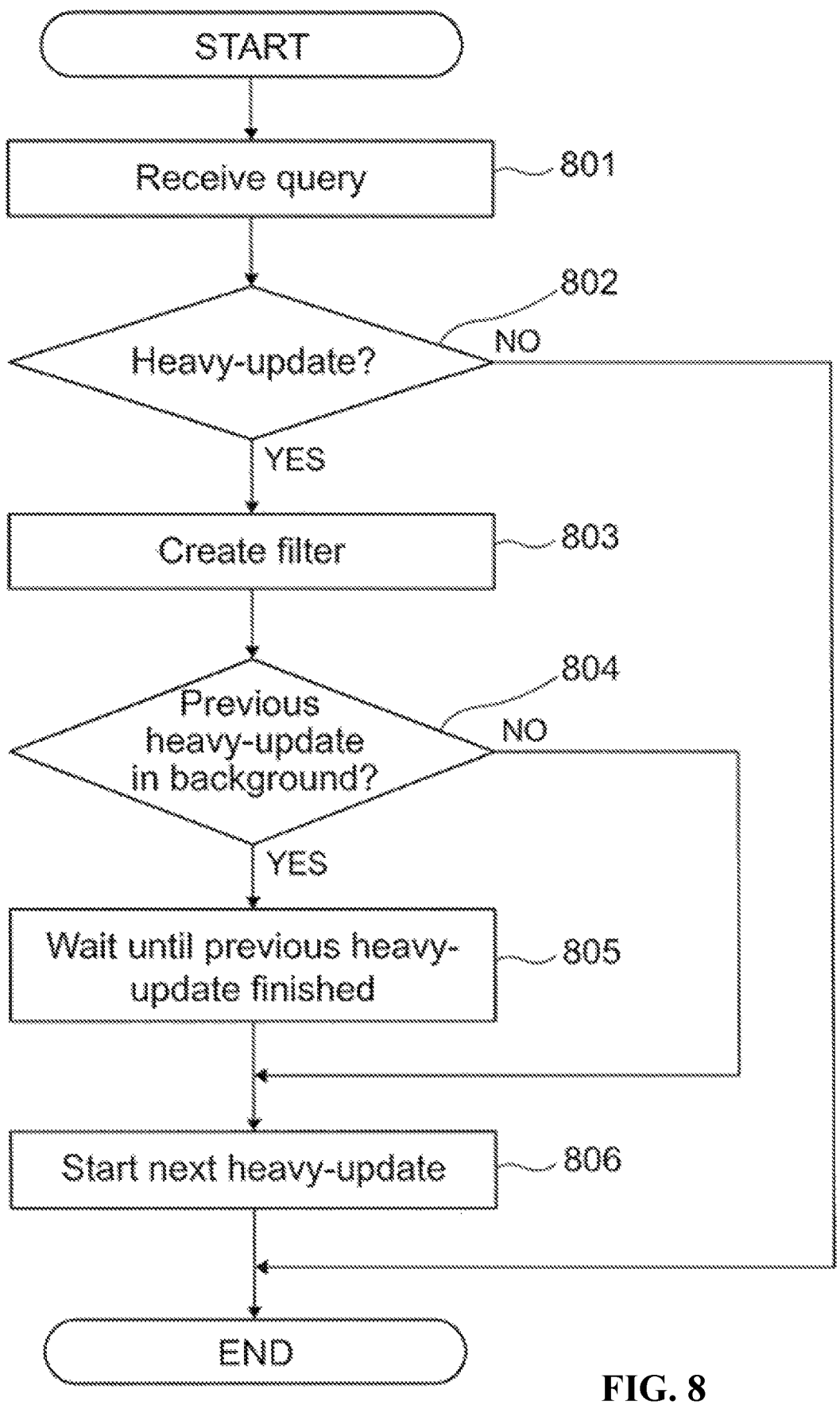
FIG. 8 depicts a flowchart of a process of applying a heavy-update, according to embodiments.

Referring to FIG. 8, an alternative embodiment of the present invention will be described. The alternative embodiment assumes that the main processing part 111 receives a query (e.g., a second query) while the background processing part 113 is executing the calculation according to a filter (e.g., the background processing part 113 is executing a previous heavy-update in the background according to a previous query).

The main processing part 111 first receives the second query at 801. The main processing part 111 then determines whether the received query (e.g., second query) calls for a heavy-update at 802. If, at 802, it is determined that the received query calls for a heavy-update, the main processing part 111 then creates a second filter at 803. The main processing part 111 then determines, at 804, whether the background processing part 113 is executing the previous heavy-update in the background. If, at 804, it is determined that the background processing part 113 is executing the previous heavy-update in the background, the background processing part 113 waits until the previous heavy-update has been finished at 805. The background processing part 113 starts to execute the subsequent heavy-update (e.g., the second query's update) in the background at 806.

Here, as an alternative embodiment of the present disclosure, the master table and the background table may share rows, except for rows that the heavy-update have been applied to. In other words, the main processing part 111 may generate the background table using copy-on-write techniques.

Referring to FIG. 9, depicted is an example of a hardware configuration of a node 101 (e.g., node 101 of FIG. 1), according to the exemplary embodiments. As shown in the figure, the node may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 9, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The CPU 91, executing a program stored in the main memory 92, may function as the main processing part 111 of FIG. 1, and/or the background processing part 113 of FIG. 1, and/or and the hash code calculator 115 of FIG. 1. The main memory 92 and the magnetic disk device 97 may function as the storage 117 of FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for updating a first database in a blockchain system to add a block to a blockchain, comprising:
    adding a first update query to the first database as a data item upon receiving the first update query to update the first database;
    calculating a first hash value based on data items stored in the first database, the stored data items including the added data item of the first update query;
    adding, using a first thread, a new block to the blockchain using the first hash value;
    generating a second database by copying the first database using copy-on-write techniques;
    updating, using a second thread, the second database according to the added data item of the first update query;
    calculating a second hash value based on data items stored in the updated second database;
    adding a second new block to the blockchain using the second hash value;
    determining, in response to the second new block addition, a threshold number of added new blocks has been met, wherein the threshold is determined according to one or more properties of the first update query; and
    replacing, in response to the determination, the first database with the second database.

2. The method according to claim 1, further comprising:
    replacing the first database with the second database at a predetermined timing.

3. The method according to claim 1, further comprising:
    replacing the first database with the second database when a predetermined number of blocks are added to the block chain.

4. The method according to claim 1, wherein
    the blockchain system comprises a plurality of nodes connected to each other via a network,
    each of the nodes comprises the first database and second database, the second database being a copy of the first database, and
    the first database is replaced with the second database when a predetermined number of blocks are added to the block chain.

5. The method according to claim 1, further comprising:
    determining not to add a second update query to the database as the data item according to an attribute of the second update query;
    updating the first database according to the second update query;
    calculating a non-added hash value based on the updated first database according to the second update query; and
    adding a third new block to the blockchain using the non-added hash value.

6. A computer program product for updating a first database in a blockchain system to add a block to a blockchain, the computer program product comprising a computer readable storage medium having program instructions embodied therewith, the program instructions executable by a computer to cause the computer to:
    add a first update query to the first database as a data item upon receiving the first update query to update the first database;
    calculate a first hash value based on data items stored in the first database, the stored data items including the added data item of the first update query;
    add, using a first thread, a new block to the blockchain using the first hash value;
    generate a second database by copying the first database using copy-on-write techniques;
    update, using a second thread, the second database according to the added data item of the first update query;
    calculate a second hash value based on data items stored in the updated second database;
    add a second new block to the blockchain using the second hash value;
    determine, in response to the second new block addition, a threshold number of added new blocks has been met, wherein the threshold is determined according to one or more properties of the first update query; and
    replace, in response to the determination, the first database with the second database.

7. The computer program product according to claim 6, the program instructions executable by a computer to further cause the computer to:
    replace the first database with the second database at a predetermined timing.

8. The computer program product according to claim 6, the program instructions executable by a computer to further cause the computer to:
  replace the first database with the second database when a predetermined number of blocks are added to the blockchain.

9. The computer program product according to claim 6, wherein the blockchain system comprises a plurality of nodes connected to each other via a network,
  each of the nodes comprises the first database and second database, the second database being a copy of the first database, and
  the first database is replaced with the second database when a predetermined number of blocks are added to the block chain.

10. The computer program product according to claim 6, the program instructions executable by a computer to further cause the computer to:
  determine not to add a second update query to the database as the data item according to an attribute of the second update query;
  update the first database according to the second update query;
  calculate a non-added hash value based on the updated first database according to the second update query; and
  add a third new block to the blockchain using the non-added hash value.

11. A system for a blockchain system to add a block to a blockchain, the system comprising:
  a memory with program instructions stored thereon; and
  a processor in communication with the memory, wherein the system is configured to perform a method, the method comprising:
    adding a first update query to the first database as a data item upon receiving the first update query to update the first database;
    calculating a first hash value based on data items stored in the first database, the stored data items including the added data item of the first update query;
    adding, using a first thread, a new block to the blockchain using the first hash value;
    generating a second database by copying the first database using copy-on-write techniques;
    updating, using a second thread, the second database according to the added data item of the first update query;
    calculating a second hash value based on data items stored in the updated second database;
    adding a second new block to the blockchain using the second hash value;
    determining, in response to the second new block addition, a threshold number of added new blocks has been met, wherein the threshold is determined according to one or more properties of the first update query; and
    replacing, in response to the determination, the first database with the second database.

12. The system according to claim 11, wherein the method further comprises: replacing the first database with the second database at a predetermined timing.

13. The system according to claim 11, wherein the method further comprises: replacing the first database with the second database when a predetermined number of blocks are added to the block chain.

14. The system according to claim 11, wherein the method further comprises:
  determining not to add a second update query to the database as the data item according to an attribute of the second update query;
  updating the first database according to the second update query;
  calculating a non-added hash value based on the updated first database according to the second update query; and
  adding a third new block to the blockchain using the non-added hash value.

15. A computer program product for updating a first database in a blockchain, wherein the blockchain is shared by a plurality of nodes included in a blockchain system, the nodes being connected to each other via a network, the nodes generating a block to be added to the blockchain according to a first update of the first database, each of the nodes determines whether to apply a first update query to the first database using a regular update, or to apply the first update query to the first database using a deferred update, upon receiving the first update query to updated the first database, the computer program product comprising a computer readable storage medium having program instructions embodied therewith, the program instructions executable by a computer to cause the computer to:
  if each node determines to apply the first update query to the database using the regular update:
    update, using a first thread, the first database according to the first update query,
    calculate a regular hash value based on the updated database, and
    add a new block to the blockchain using the regular hash value; and
  if each node determines to apply the first update query to the first database using the deferred update:
    generate a second database by copying the first database using copy-on-write techniques;
    add the first update query to the database as a data item of the first database,
    calculate a deferred has value based on the database to which the first update query is added as the data item,
    add a new block to the blockchain using the deferred hash value,
    update, using a second thread, the second database according to the data item of the first update query added to the first database,
    replace, in response to a determination that a threshold number of added new block has been met, the first database with the second, wherein the threshold is determined according to one or more properties of the first update query,
    calculate a replaced hash value based on the replaced database, and
    add a second new block to the blockchain using the replaced hash value.

16. The computer program product of claim 15, wherein each node receives a second update query and determines to apply the second update query to the first database using the regular update, wherein the program instructions further cause the computer to:
  prior to updating the second database according to the first update query, update the first database by applying the first update query and the second update query to the first database;
  calculate an updated hash value based on the first database updated with the first update query and the second update query; and update the second database by applying the first update query and the second update query to the second database.

17. The method of claim 1, wherein the first update query calls a heavy-update.

18. The method of claim 4, wherein each node replaces the first database with the second database in parallel.

19. The method of claim 1, wherein the one or more properties of the first update query includes a determination of the number of blocks between the block and a second block, wherein the second block calls for a heavy-update.

20. The method of claim 19, wherein the first database includes a data tree structure, and wherein the data item is stored in a modified leaf node, and wherein the hash value is calculated based on a subset of nodes of the data tree structure and a set of edges connecting the subset, the subset including a chain of nodes from the modified leaf node to the root node.

* * * * *